US012757053B2

(12) United States Patent
Shi et al.

(10) Patent No.: US 12,757,053 B2
(45) Date of Patent: Oct. 6, 2026

(54) METHOD FOR CONTROLLING TRIGGERING OF MEASUREMENT RELAXATION CRITERION, COMMUNICATION APPARATUS AND STORAGE MEDIUM

(71) Applicant: BEIJING XIAOMI MOBILE SOFTWARE CO., LTD., Beijing (CN)

(72) Inventors: Rao Shi, Beijing (CN); Yanhua Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 313 days.

(21) Appl. No.: 18/681,415

(22) PCT Filed: Aug. 6, 2021

(86) PCT No.: PCT/CN2021/111090

§ 371 (c)(1),
(2) Date: Feb. 5, 2024

(87) PCT Pub. No.: WO2023/010500

PCT Pub. Date: Feb. 9, 2023

(65) Prior Publication Data

US 2024/0349105 A1 Oct. 17, 2024

(51) Int. Cl.
*H04W 24/10* (2009.01)
*H04W 24/02* (2009.01)

(52) U.S. Cl.
CPC .......... *H04W 24/10* (2013.01); *H04W 24/02* (2013.01)

(58) Field of Classification Search
CPC .............................. H04W 24/10; H04W 24/02
USPC ........................................................ 370/329
See application file for complete search history.

(56) References Cited

U.S. PATENT DOCUMENTS

2010/0260059 A1* 10/2010 Zhang .............. H04W 56/0015 375/267
2015/0146595 A1* 5/2015 Jamadagni ........ H04W 52/0235 370/311
2016/0073344 A1* 3/2016 Vutukuri ........... H04W 52/0229 370/252
2017/0150384 A1* 5/2017 Rune .................. H04W 72/542
2020/0229155 A1* 7/2020 Chien ................. H04W 72/044
2020/0314816 A1* 10/2020 Yi ........................ H04L 5/0094
2021/0105647 A1* 4/2021 Lee .................. H04W 36/0094
2021/0329591 A1* 10/2021 Hwang ................ H04L 5/0051
2021/0352507 A1* 11/2021 He .................... H04W 52/0232
2022/0116802 A1* 4/2022 Kim ...................... H04W 76/27
(Continued)

FOREIGN PATENT DOCUMENTS

CN 108307686 A 7/2017

OTHER PUBLICATIONS

PCT/CN2021/111090, International Search Report dated Mar. 28, 2022, 2 pages.

*Primary Examiner* — Mark G. Pannell
(74) *Attorney, Agent, or Firm* — Cozen O'Connor

(57) ABSTRACT

A method for controlling triggering of a relaxed measurement criterion, performed by a terminal device, including receiving configuration information configured by a network device when the terminal device enters a connected state, and restricting a reporting behavior when the terminal device in the connected state meets the relaxed measurement criterion, according to the configuration information.

19 Claims, 5 Drawing Sheets

(56) References Cited

U.S. PATENT DOCUMENTS

| | | | | |
|---|---|---|---|---|
| 2022/0217565 | A1* | 7/2022 | Thangarasa | H04W 24/10 |
| 2022/0330339 | A1* | 10/2022 | Siomina | H04W 36/249 |
| 2024/0015653 | A1* | 1/2024 | He | H04W 76/28 |
| 2024/0267768 | A1* | 8/2024 | Dalsgaard | H04W 8/22 |
| 2024/0314879 | A1* | 9/2024 | Jeong | H04W 76/20 |
| 2024/0373421 | A1* | 11/2024 | Jang | H04L 5/0012 |

* cited by examiner

METHOD FOR CONTROLLING TRIGGERING OF MEASUREMENT RELAXATION CRITERION, COMMUNICATION APPARATUS AND STORAGE MEDIUM

CROSS-REFERENCE TO RELATED APPLICATION

This application is a U.S. national phase application of International Patent Application No. PCT/CN2021/111090, filed on Aug. 6, 2021, the entire contents of which are incorporated herein by reference.

FIELD

The present disclosure relates to the field of communication technologies, and more particularly, to a method for controlling triggering of a relaxed measurement criterion, a communication device, and a storage medium.

BACKGROUND

In a mobile communication system, the movement of a user equipment (UE) causes channel conditions around it to change instantaneously. In order to support the mobility of the UE and acquire current cell channel conditions of the UE in time, a network configures radio resource management (RRM) measurement for the UE to measure signal quality of a current serving cell and a neighboring cell of the UE. However, too many measurements also increases the power consumption of the UE, affecting battery life. Therefore, in the Rel-16 version, a new radio (NR) introduces two RRM relaxed measurement criteria for the UE in an idle state. When the UE is at low mobility and/or non-cell edge, it is considered that the UE is less likely to perform a cell reselection at this time, and the UE may be allowed to perform RRM relaxed measurement to a certain extent, such as extending a measurement period or stopping measurement of the neighboring cell, so as to achieve the goal of saving power consumption.

For a reduce capability (RedCap) device, a relaxed measurement criterion is introduced into a connected state in the Rel-17 version. For relaxed measurement in the connected state, the UE not only needs to meet the relaxed measurement criterion, but also needs to report to the network, and the network controls whether to let it relax. In this way, in case that the UE in the connected state frequently determines whether the relaxed measurement criterion is met, it will cause the network to be reported frequently, and the network also needs to respond accordingly, resulting in unnecessary overhead.

SUMMARY

In a first aspect, an embodiment of the present disclosure provides a method for controlling triggering of a relaxed measurement criterion. The method is performed by a terminal device and includes receiving configuration information configured by a network device when the terminal device enters a connected state, and restricting a reporting behavior when the terminal device in the connected state meets the relaxed measurement criterion, according to the configuration information.

In a second aspect, an embodiment of the present disclosure provides another method for controlling triggering of a relaxed measurement criterion. The method is performed by a network device and includes configuring configuration information for a terminal device when the terminal device enters a connected state, and sending the configuration information to the terminal device. The configuration information is configured to restrict a reporting behavior when the terminal device in the connected state meets the relaxed measurement criterion.

In a third aspect, an embodiment of the present disclosure provides a communication device. The communication device includes a processor, and a memory having stored therein computer programs. The processor is configured to execute the computer programs stored in the memory to cause the communication device to perform the method described in the first aspect.

In a fourth aspect, an embodiment of the present disclosure provides a communication device. The communication device includes a processor, and a memory having stored therein computer programs. The processor is configured to execute the computer programs stored in the memory to cause the communication device to perform the method described in the second aspect.

In a fifth aspect, an embodiment of the present invention provides a non-transitory computer-readable storage medium having stored therein instructions used for the terminal device that, when executed, cause the terminal device to perform the method described in the first aspect.

In a sixth aspect, an embodiment of the present invention provides a non-transitory computer-readable storage medium having stored therein instructions used for the network device that, when executed, cause the network device to perform the method described in the second aspect.

BRIEF DESCRIPTION OF THE DRAWINGS

In order to more clearly illustrate technical solutions in embodiments of the present disclosure or the background, the following description will be given to the accompanying drawings, which are needed to be used in the embodiments of the present disclosure or the background.

DETAILED DESCRIPTION

Figure 1:
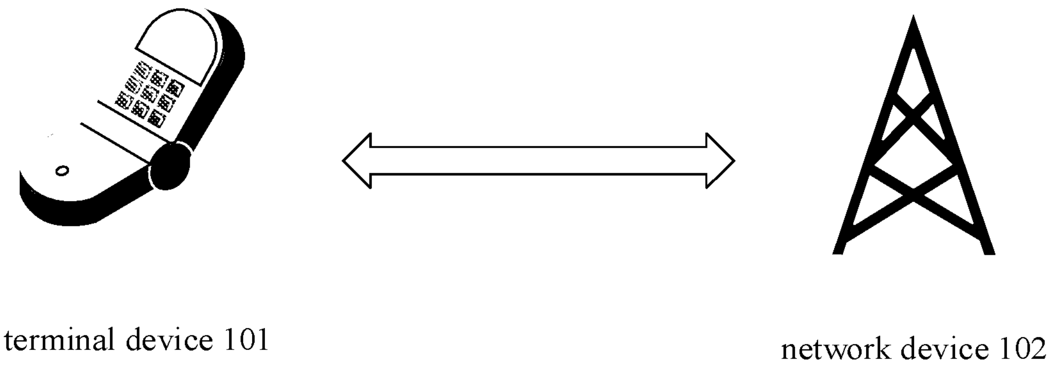
FIG. 1 is a schematic diagram of a communication system provided in an embodiment of the present disclosure.

Embodiments of the present disclosure are described in detail below, examples of which are illustrated in the accompanying drawings. The same or similar reference numerals represent the same or similar elements or elements having the same or similar functions throughout the descriptions. The embodiments described below with reference to the accompanying drawings are illustrative, and are intended to explain the present disclosure and cannot be construed as limiting the present disclosure. In the description of the present disclosure, unless otherwise specified, "/" means or. For example, A/B may mean A or B. As used herein, "and/or" is merely an association relationship that describes associated objects, meaning that there may be three relationships. For example, A and/or B may mean that A exists alone, A and B exist simultaneously, and B exists alone.

In order to better understand a method for controlling triggering of a relaxed measurement criterion disclosed in an embodiment of the present disclosure, a communication system to which the embodiment of the present disclosure is applicable is firstly described below.

Referring to FIG. 1, FIG. 1 is a schematic diagram of a communication system provided in an embodiment of the present disclosure. The communication system may include, but is not limited to, one network device, and one terminal device. The number and form of devices shown in FIG. 1 are for illustration merely, and do not constitute a limitation of the embodiment of the present disclosure. In a practical application, the communication system may include two or more network devices, and two or more terminal devices. The communication system shown in FIG. 1 includes one network device 101 and one terminal device 102 as an example.

It is to be noted that the technical solution of the embodiment of the present disclosure may be applied to various communication systems, for example, a long term evolution (LTE) system, a 5th generation (5G) mobile communication system, a 5G new radio (NR) system, or other future new mobile communication systems, etc.

The network device 101 in the embodiment of the present disclosure is an entity on a network side for transmitting or receiving signals. For example, the network device 101 may be an evolved NodeB (eNB), a transmission reception point (TRP), a next generation NodeB (gNB) in an NR system, a base station in other future mobile communication systems, or an access node in a wireless fidelity (WiFi) system, etc. A specific technology and a specific device form adopted by the network device are not limited in the embodiment of the present disclosure. The network device provided in the embodiment of the present disclosure may be composed of a central unit (CU) and a distributed unit (DU). The CU may also be referred to as a control unit. A structure adopting a CU-DU may separate the network device, such as protocol layers of a base station, functions of part of the protocol layers are centralized controlled by the CU, functions of the remaining part or all of the protocol layers are distributed in the DU, and the DU is centrally controlled by the CU.

The terminal device 102 in the embodiment of the present disclosure is an entity on a user side configured to receive or transmitting signals, such as a mobile phone. A terminal may also be referred to as a terminal device, a user equipment (UE), a mobile station (MS), a mobile terminal (MT), and so on. The terminal may be a car with a communication function, a smart car, a mobile phone, a wearable device, a Pad, a computer with a wireless transceiver function, a virtual reality (VR) terminal, an augmented reality (AR) terminal, a wireless terminal in an industrial control, a wireless terminal in self-driving, a wireless terminal in a remote medical surgery, a wireless terminal in smart grid, a wireless terminal in transportation safety, a wireless terminal in a smart city, a wireless terminal in a smart home, etc. A specific technology and a specific device form adopted by the terminal are not limited in the embodiment of the present disclosure.

It may be understood that the communication system described in the embodiment of the present disclosure is to illustrate the technical solution of the embodiment of the present disclosure more clearly, and does not constitute a limitation of the technical solution provided in the embodiment of the present disclosure. It is known by those of ordinary skill in the art that with the evolution of a system architecture and the emergence of new business scenarios, the technical solution provided in the embodiment of the present disclosure is also applicable to similar technical problems.

It is worth noting that in the communication system, the movement of the terminal device 102 causes channel conditions around it to change instantaneously. In order to support the mobility of the terminal device 102 and acquire current cell channel conditions of the terminal device 102, the network device 101 configures RRM measurement for the terminal device 102 to measure signal quality of a current serving cell and a neighboring cell of the terminal device 102. However, too much RRM measurement also increases the power consumption of the terminal device 102, which affects the battery life of the terminal device 102. Therefore, in the Rel-16 version, a NR introduces two RRM relaxed measurement criteria for the terminal device 102 in an idle state. When the terminal device 102 is at low mobility and/or non-cell edge, it is considered that the terminal device 102 is less likely to perform a cell reselection at this time, and the terminal device 102 may be allowed to perform RRM relaxed measurement to a certain extent, such as extending a measurement period or stopping measurement of the neighboring cell, so as to achieve the purpose of saving power consumption. In addition, in the Rel-17 version, the 3rd generation partnership project (3GPP) working group hopes to further study RRM relaxed measurement of a RedCap device type and introduce the RRM relaxed measurement into a connected state.

For the redcap device, the relaxed measurement criterion may be introduced into the connected state in the Rel-17 version. Since service data is scheduled for a user in a connected state at this time, user experience needs to be guaranteed. However, the relaxed measurement may prevent the terminal device 102 from evaluating the signal quality of the neighboring cell efficiently, resulting in service interruption due to the failure to switch timely. Therefore, for the relaxed measurement in the connected state, the terminal device 102 not only needs to meet the relaxed measurement criterion, but also needs to report to the network, and the network device 101 controls whether to let it relax. In case that the terminal device 102 in the connected state frequently determines whether the relaxed measurement criterion is met, it will cause the network device 101 to be reported frequently, and the network device 101 will respond accordingly, resulting in unnecessary overhead.

Based on the above-mentioned problems, the present disclosure provides a method for controlling triggering of a relaxed measurement criterion, a communication device, and a storage medium. The method for controlling the triggering of the relaxed measurement criterion, the communication device, and the storage medium provided in the present disclosure are described in detail below with reference to the accompanying drawings.

Figure 2:
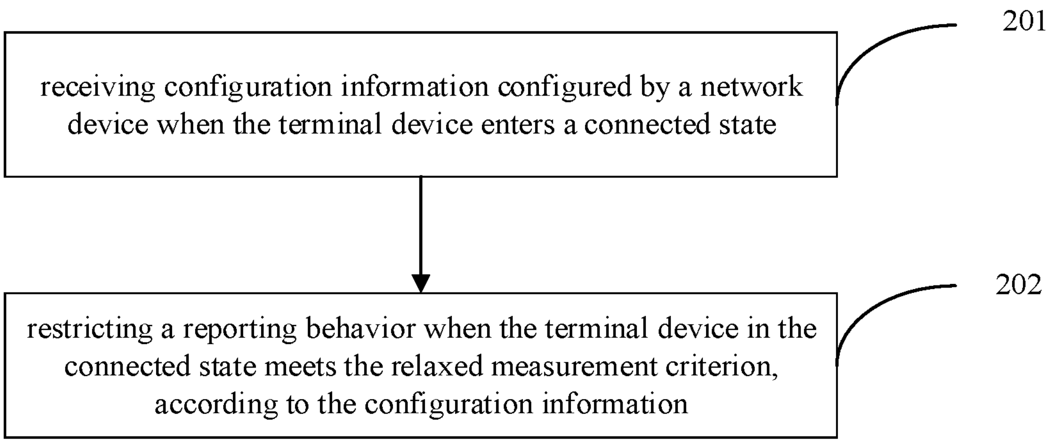
FIG. 2 is a flow chart of a method for controlling triggering of a relaxed measurement criterion provided in an embodiment of the present disclosure.

Referring to FIG. 2, FIG. 2 is a flow chart of a method for controlling triggering of a relaxed measurement criterion provided in an embodiment of the present disclosure. It is to be noted that the method may be performed by a terminal device. As shown in FIG. 2, the method may include, but is not limited to steps as follows.

In step 201, configuration information configured by a network device when the terminal device enters a connected state is received.

In a possible implementation, when the terminal device enters the connected state, the network device configures the configuration information for the terminal device. The configuration information is sent to the terminal device, so that the terminal device may receive the configuration information.

In an embodiment of the present disclosure, the configuration information configured by the network device when the terminal device enters the connected state may at least include any one of a reporting prohibition timer, or a decision period configured for the relaxed measurement criterion. The reporting prohibition timer may be understood as prohibiting the terminal device from reporting relevant indication information to the network device when the timer is running. The decision period configured for the relaxed measurement criterion may be understood as that the terminal device may report indication information that the relaxed measurement criterion is met to the network device merely after the terminal device meets a certain relaxed measurement criterion and reaches a corresponding decision period. The reporting prohibition timer may be a timer configured by the network device one for each relaxed measurement criterion, or may be a timer configured by the network device one for multiple relaxed measurement criteria. The decision period configured for the relaxed measurement criterion may be a decision period configured for a certain relaxed measurement criterion. For example, the network device may configure a decision period corresponding to the relaxed measurement criterion by modifying a formula of a certain relaxed measurement criterion.

In step 202, according to the configuration information, a reporting behavior when the terminal device in the connected state meets the relaxed measurement criterion is restricted.

It is to be noted that the relaxed measurement criterion may include, but is not limited to the following rules.

(1) Low Mobility Criterion

In a certain period of time ($T_{SearchDeltaP}$), in case that a difference between a reference received signal strength ($Srxlev_{Ref}$) and a serving cell signal strength (Srxlev) of the terminal device at a current moment is less than a preset threshold ($S_{SearchDeltaP}$), it represents that an amplitude of a signal of the terminal device does not change much, and it is considered that the UE is currently in a low mobility state. Parameters $S_{SearchDeltaP}$ and $T_{SearchDeltaP}$ are provided by a network terminal, and formulas are specified in a protocol.

(2) Non-Cell Edge Criterion

In case that a received signal strength (Srxlev) of a current serving cell of the terminal device is greater than a preset threshold ($S_{SearchThresholdP}$) and a received signal quality (Squal) is greater than a preset threshold ($S_{SearchThresholdQ}$), it is considered that the terminal device is not at an edge of the cell. The $S_{SearchThresholdP}$ and the $S_{SearchThresholdQ}$ are configured by a network, and formulas are specified in a protocol.

(3) Stationary Criterion

In a possible implementation, a stationary criterion is to set a more stringent threshold parameter based on the low mobility criterion, that is, compared with low mobility, in a longer time ($T_{SearchDeltaP\_stationary}$, and $T_{SearchDeltaP\_stationary} > T_{SearchDeltaP}$), in case that a difference between a reference signal received strength ($Srxlev_{Ref}$) and a serving cell signal strength (Srxlev) of the terminal device at a current moment is less than a smaller preset threshold ($S_{SearchDeltaP\_stationary}$, and $S_{SearchDeltaP\_stationary} < S_{SearchDeltaP}$), it represents that an amplitude of a signal of the terminal device does not change much. Parameters $T_{SearchDeltaP\_stationary}$ and $S_{SearchDeltaP\_stationary}$ provided by the network device, and formulas are specified in a protocol.

In the embodiment of the present disclosure, the network device may configure RRM measurement and the relaxed measurement criterion for the terminal device. In this way, the terminal device may measure signal quality of a current serving cell and a neighboring cell to determine whether the relaxed measurement criterion is met at present. In the prior art, the terminal device in the connected state continuously measures signal quality to determine whether the relaxed measurement criterion is met at present, and at the same time, reports to the network frequently, resulting in unnecessary overhead. In the embodiment of the present disclosure, according to the configuration information, the reporting behavior when the terminal device in the connected state meets the relaxed measurement criterion is restricted, so as to achieve the purpose of saving signaling overhead.

In an example, the configuration information includes the reporting prohibition timer, and the timer is not running. When the terminal device in the connected state meets a certain relaxed criterion by the RRM measurement, the indication information that the relaxed criterion is met may be reported to the network and the timer is used for timing. In case that the terminal device meets a certain relaxed criterion again during the timing, it may report to the network merely after a timing time of the timer reached, thus restricting the reporting behavior when the terminal device in the connected state meets the relaxed criterion.

In another example, the configuration information includes the decision period configured for the relaxed measurement criterion. Merely when the terminal device in the connected state meets a certain relaxed criterion for a time exceeding a duration of the decision period by RRM measurement, the terminal device may report indication information that a certain relaxed criterion is met to the network device, so that the reporting behavior when the terminal device in the connected state meets the relaxed measurement criterion may be restricted.

By implementing the embodiment of the present disclosure, the reporting behavior when the terminal device in the connected state meets the relaxed measurement criterion is restricted, frequent reporting by the terminal device may be avoided, thus saving signaling overhead and preventing waste of network resources.

Since the configuration information may include the reporting prohibition timer, may also include the decision period configured for the relaxed measurement criterion, or include other information that may be configured to restrict the reporting behavior of the terminal device. The configuration information including the reporting prohibition timer, and the configuration information including the decision period configured for the relaxed measurement criterion are taken as an example for specific description below.

Figure 3:
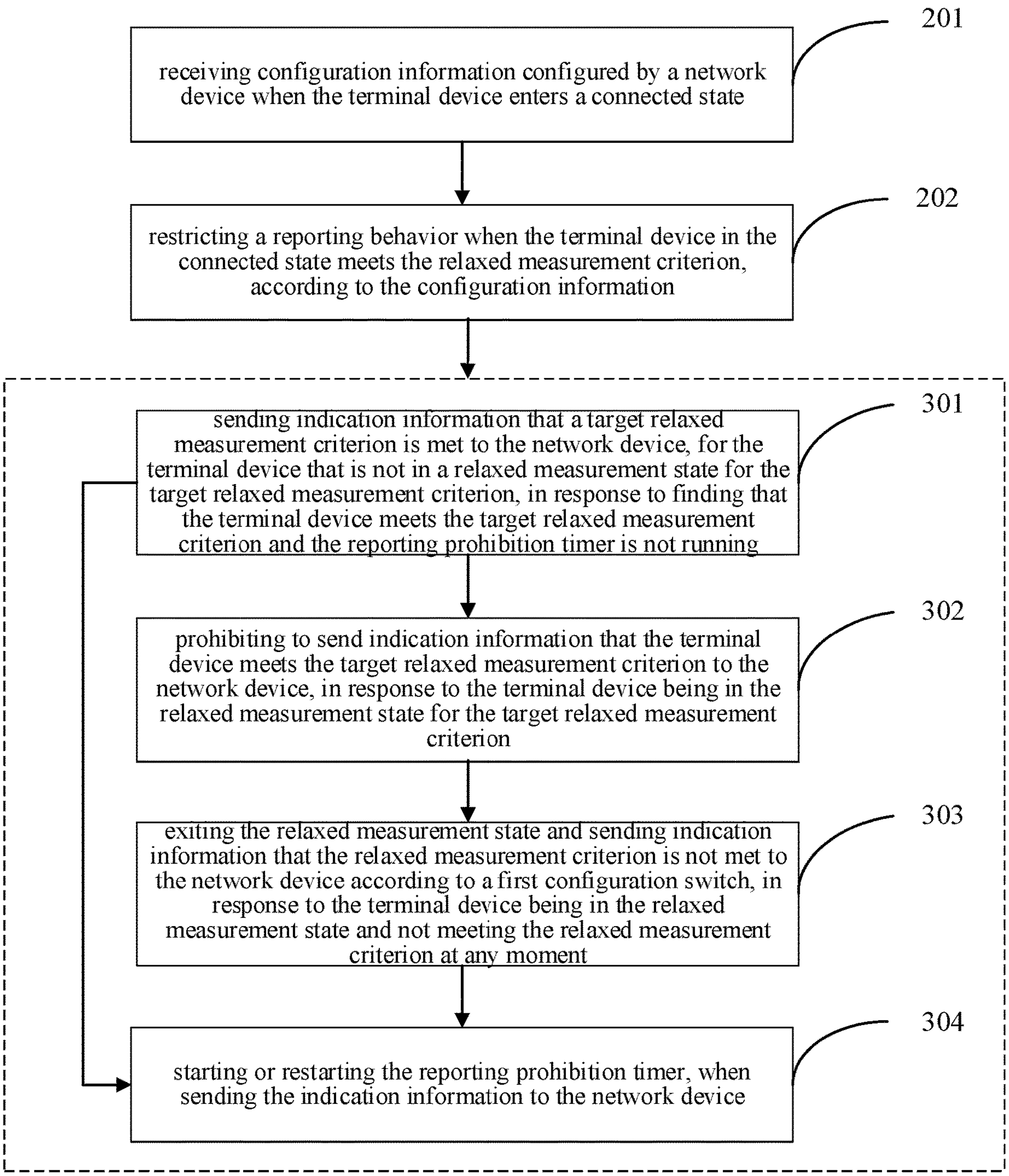
FIG. 3 is a flow chart of another method for controlling triggering of a relaxed measurement criterion provided in an embodiment of the present disclosure.

FIG. 3 is a flow chart of another method for controlling triggering of a relaxed measurement criterion provided in an embodiment of the present disclosure. In an embodiment of the present disclosure, the configuration information includes the reporting prohibition timer. The reporting prohibition timer may be a timer configured by the network device one for each relaxed measurement criterion. Alternatively, the reporting prohibition timer is a timer configured by the network device one for multiple relaxed measurement criteria. As shown in FIG. 3, based on the above-mentioned embodiments, according to the configuration information, an implementation of restricting the reporting behavior when the terminal device in the connected state meets the relaxed measurement criterion may include, but is not limited to steps as follows.

In step 301, for the terminal device that is not in a relaxed measurement state for a target relaxed measurement criterion, in response to finding that the terminal device meets the target relaxed measurement criterion and the reporting prohibition timer is not running, indication information that the target relaxed measurement criterion is met is sent to the network device.

In some embodiments of the present disclosure, each relaxed measurement criterion corresponds to various relaxed measurement states. The target relaxed measurement criterion may be understood as that, in case that a current terminal device meets a certain relaxed criterion, and the terminal device is not in a relaxed measurement state for the relaxed criterion, the relaxed measurement criterion is the target relaxed measurement criterion in the embodiment of the present disclosure. In addition, the relaxed measurement state refers to a state in which the terminal device performs measurement according to more relaxed RRM measurement parameters on the premise that the terminal device meets a RRM relaxed measurement criterion. In some embodiments of the present disclosure, the terminal device measures signal quality according to configured RRM measurement when not being in the relaxed measurement state, so as to determine whether to perform a cell handover and whether the relaxed measurement criterion is met. The terminal device may perform measurement according to more relaxed RRM measurement parameters when being in the relaxed measurement state. In an example, the terminal device in a relaxed measurement state may use a larger period to measure the signal quality. In a possible implementation, the larger period may be N times a measurement period not in the relaxed state (where Nis a value greater than 1).

In the embodiment of the present disclosure, in case that the reporting prohibition timer is not running, it means that the timer is not currently started or has expired. That is, in case that the terminal device is not in a relaxed measurement state for a certain relaxed measurement criterion, the terminal device currently meets the relaxed measurement criterion at the same time, and the reporting prohibition timer is not currently started or has expired, the terminal device is allowed to send the indication information that the relaxed measurement criterion is met to the network device. In addition, in case that the terminal device is not in a relaxed measurement state for a certain relaxed measurement criterion, the terminal device currently meets the relaxed measurement criterion at the same time, and the reporting prohibition timer is currently running (the reporting prohibition timer has been started and has not timed out), it is prohibited that the terminal device send the indication information that the relaxed measurement criterion is met to the network device.

It is to be noted that the reporting prohibition timer has nothing to do with a parameter value in the relaxed measurement criterion (such as $T_{SearchDeltaP}$ in the low mobility criterion). In an example, even if the terminal device meets the low mobility criterion within a period of time $T_{SearchDeltaP}$, in case that the reporting prohibition timer is running at this time, the reporting behavior is not performed by the terminal device. That is, the reporting prohibition timer is merely related to the frequency at which the terminal device reports the indication information about the relaxed measurement criterion to the network device.

In an implementation, for a case where the terminal device is in the relaxed measurement state for the target relaxed measurement criterion, the implementation of step 202 may also include step 302. In step 302, it is prohibited to send indication information that the terminal device meets the target relaxed measurement criterion to the network device, in response to the terminal device being in the relaxed measurement state for the target relaxed measurement criterion.

It may be understood that, the terminal device in the relaxed measurement state for the target relaxed measurement criterion performs signal strength measurement with relaxed measurement in the relaxed state, so as to determine whether the terminal device meets a certain relaxed measurement criterion. In case that the terminal device still meets the target relaxed measurement criterion by measurement, there is no need to send the indication information that the terminal device meets the target relaxed measurement criterion to the network device at this time. Since the indication information reported in the above-mentioned situation is repeated indication information, waste of network resources may be reduced and signaling overhead is saved.

In addition, the terminal device in the above-mentioned relaxed measurement state may not meet the relaxed measurement state at a certain moment. In order to make scenarios covered by the embodiments of the present disclosure more comprehensive, the implementation of step 202 may also include step 303. In step 303, the relaxed measurement state is exited and indication information that the relaxed measurement criterion is not met is sent to the network device according to a first configuration switch, in response to the terminal device being in the relaxed measurement state and not meeting the relaxed measurement criterion at any moment.

That is, when exiting the relaxed measurement state, the reporting prohibition timer is not considered. In case that the terminal device in a relaxed measurement state for a certain relaxed measurement criterion does not meet the relaxed measurement criterion, the relaxed measurement state is exited, and the indication information that the relaxed measurement criterion is not met is sent to the network device according to a configuration switch. In this way, when a certain relaxed measurement criterion is not met, a corresponding relaxed measurement state is exited in time, which may avoid a situation that the terminal device in the connected state cannot switch timely to cause service interruption due to the inability to measure the signal quality efficiently. In addition, whether to send the indication information to the network device is determined according to the first configuration switch, which also increases the flexibility of configuration and improves the applicability of the method.

In an example, the implementation of sending the indication information that the relaxed measurement criterion is not met to the network device according to the first configuration switch may be as follows. The indication information that the relaxed measurement criterion is not met is sent to the network device, in response to the first configuration switch being in a first state. It is prohibited to send the indication information that the relaxed measurement criterion is not met to the network device, in response to the first configuration switch being in a second state.

In order to better reflect the function of the reporting prohibition timer, in the embodiment of the present disclosure, the implementation of step 202 may also include step 304. In step 304, the reporting prohibition timer is started or restarted, when the indication information is sent to the network device.

That is, when the indication information is sent to the network device, in case that the reporting prohibition timer is not started, the reporting prohibition timer is started. In case that the reporting prohibition timer is started, the reporting prohibition timer is restarted, so that the reporting prohibition timer may start timing after the terminal device sends the indication information to the network device each time. Since the reporting behavior of the relaxed measurement criterion is prohibited in a process of a timer operation, the reporting behavior when the terminal device in the connected state meets the relaxed measurement criterion is restricted, and the signaling overhead is saved.

For example, when the indication information that the target relaxed measurement criterion is met is sent to the network device in step 301, the reporting prohibition timer may be started or restarted. In another example, when the indication information that the relaxed measurement criterion is not met is sent to the network device in step 303, the reporting prohibition timer may be restarted.

In order to make the above-mentioned implementation easy to understand, the reporting prohibition timer being the timer configured by the network device one for each relaxed measurement criterion, and the reporting prohibition timer being the timer configured by the network device one for multiple relaxed measurement criteria are respectively taken as an example for specific description below.

Example 1 (the Reporting Prohibition Timer being the Timer Configured by the Network Device One for Each Relaxed Measurement Criterion)

It is to be noted that, in this example, a reporting prohibition timer configured by the network device for the non-cell edge criterion is taken as an example for illustration.

(1) When the terminal device enters the connected state, the network device may configure the relaxed measurement criterion and a corresponding reporting prohibition timer (the reporting prohibition timer is not running at this time) for the terminal device in some way, such as a radio resource control (RRC) dedicated signaling, and send them to the terminal device.

(2) For the terminal device that is not in the relaxed measurement state, when it is found that the non-cell edge criterion is met and the timer is not running, indication information that the non-cell edge criterion is met is sent to the network device, and the reporting prohibition timer is started.

(3) For the terminal device that is in the relaxed measurement state, but it is continuously determined that the non-cell edge criterion is still met by signal measurement of the serving cell, at this time, the terminal device does not send indication information that the non-cell edge criterion is met to the network device.

(4) For the terminal device that is in the relaxed measurement state, when the terminal device does not meet the non-cell edge criterion at a certain moment, it may immediately exit the relaxed measurement, and may send indication information that the non-cell edge criterion is not met to the network device according to the first configuration switch. For example, in case that the first configuration switch is true, indication information that the non-cell edge criterion is not met is sent to the network device, and the reporting prohibition timer is restarted. In case that the first configuration switch is false, it is prohibited to send indication information that the non-cell edge criterion is not met to the network device.

(5) For the terminal device that is not in the relaxed measurement state, when it is found that the non-cell edge criterion is met again, in case that the reporting prohibition timer is in a running state, it is prohibited to send the indication information that the non-cell edge criterion is met to the network device, and report same after the reporting prohibition timer expires.

Example 2 (the Reporting Prohibition Timer being the Timer Configured by the Network Device One for Multiple Relaxed Measurement Criteria)

(1) When the terminal device enters the connected state, the network device configures the relaxed measurement criterion and a corresponding reporting prohibition timer (the reporting prohibition timer is not running at this time) for the terminal device in some way, such as a RRC dedicated signaling, and sends them to the terminal device.

(2) For the terminal device that is not in any relaxed measurement state at this time, when it is found that the non-cell edge criterion is met and the timer is not running, it sends indication information that the non-cell edge criterion is met to the network device and starts the reporting prohibition timer.

(3) For the terminal device that is in a relaxed measurement state at non-cell edge at this time, when it is found that the low mobility criterion is met, in case that the reporting prohibition timer is still running, the terminal device will not send indication information that the mobility criterion is met to the network device at this time, and may merely report when the reporting prohibition timer expires.

(4) For the terminal device that is in a relaxed measurement state at non-cell edge and low mobility at this time, when the terminal device does not meet the non-cell edge criterion at a certain moment, it may exit a corresponding relaxed measurement state, and send indication information that the non-cell edge criterion is not met to the network device according to the second configuration switch. For example, in case that the second configuration switch is true, indication information that the non-cell edge criterion is not met is sent to the network device, and the reporting prohibition timer is restarted. In case that the second configuration switch is false, it is prohibited to send indication information that the non-cell edge criterion is not met to the network device.

(5) For the terminal device that is in a relaxed measurement state with low mobility at this time, when the terminal device does not meet the low mobility criterion at a certain moment, it may exit a state corresponding to the relaxed measurement, and send indication information that the low mobility criterion is not met to the network device according to the second configuration switch. For example, in case that the second configuration switch is true, indication information that the low mobility criterion is not met is sent to the network device, and the reporting prohibition timer is restarted. In case that the second configuration switch is false, it is prohibited to send indication information that the low mobility criterion is not met to the network device.

(6) For the terminal device that is not in any relaxed measurement state at this time, in case that the non-cell edge criterion is met again, but the reporting timer is still running, it is prohibited that the terminal device send indication information that the non-cell edge criterion is met to the network device, and it may merely be reported after the timer expires.

According to the method for controlling the triggering of the relaxed measurement criterion in the embodiment of the present disclosure, for the terminal device that is not in the relaxed measurement state, when it is found that the terminal device meets the relaxed measurement criterion, whether to report to the network device is determined by a running condition of the reporting prohibition timer, so as to restrict the frequency of the terminal device reporting to the network, thus saving network signaling overhead. At the same time, for the terminal device in a relaxed state corresponding to a certain relaxed measurement criterion, the indication information that the relaxed measurement criterion is met is not sent to the network device, so as to avoid waste of network resources caused by reporting repeated indication information. In addition, for the terminal device in the relaxed measurement state, when it is found that the relaxed measurement criterion is not met, regardless of the reporting prohibition timer, the relaxed measurement state is exited immediately, and the indication information that the relaxed measurement criterion is not met may be sent to the network device based on the configuration switch. In this way, on the one hand, it may avoid the situation that the terminal device in the connected state cannot switch timely to cause service interruption due to the inability to measure the signal quality efficiently. On the other hand, the flexibility of configuration may be increased and the applicability of the method is improved by determining whether to send the indication information to the network device according to the configuration switch.

Figure 4:
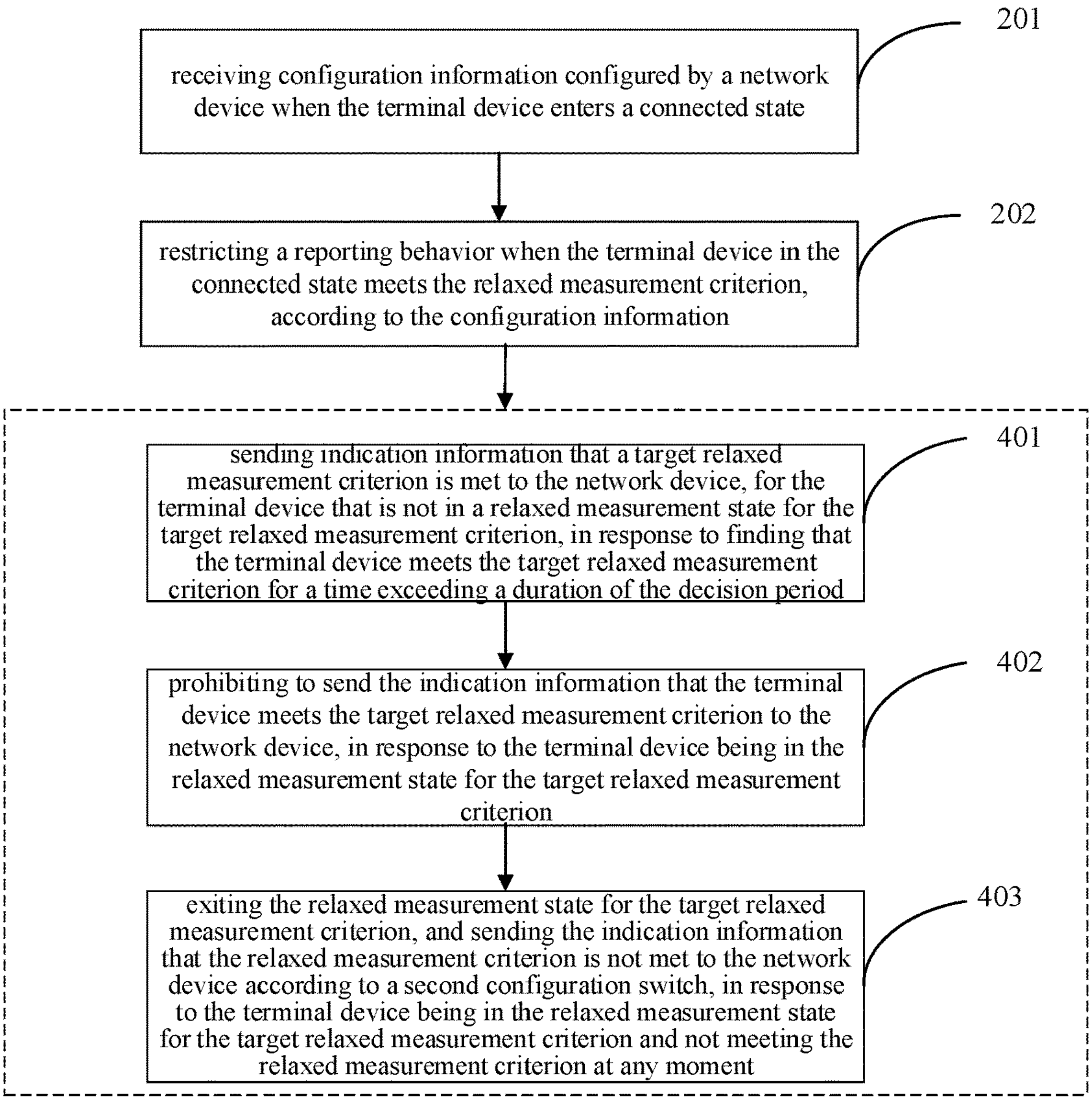
FIG. 4 is a flow chart of another method for controlling triggering of a relaxed measurement criterion provided in an embodiment of the present disclosure.

FIG. 4 is a flow chart of another method for controlling triggering of a relaxed measurement criterion provided in an embodiment of the present disclosure. In the embodiment of the present disclosure, the configuration information includes the decision period configured for the relaxed measurement criterion. As shown in FIG. 4, based on the above-mentioned embodiments, the implementation of restricting the reporting behavior when the terminal device in the connected state meets the relaxed measurement criterion, according to the configuration information, may include, but is not limited to steps as follows.

In step 401, indication information that a target relaxed measurement criterion is met is sent to the network device, for the terminal device that is not in a relaxed measurement state for the target relaxed measurement criterion, in response to finding that the terminal device meets the target relaxed measurement criterion for a time exceeding a duration of the decision period.

That is, the terminal device that is not in the relaxed measurement state for the target relaxed measurement criterion may send the indication information that the target relaxed measurement criterion is met to the network device merely after it continues to meet the target relaxed measurement criterion for a period of time. The period of time is a duration of a configured decision period. In this way, by limiting the decision period, a situation that the terminal device reports to the network device due to meeting the relaxed measurement criterion temporarily may be avoided, so that a situation that the terminal device reports frequently may be avoided and network signaling overhead may be saved.

It is to be noted that a decision period for the non-cell edge criterion is not necessarily related to parameter values in the low mobility criterion and other relaxed measurement criteria, for example, $T_{SearchDeltaP}$ in the low mobility criterion. For a decision period for the low mobility criterion, the decision period needs to be greater than $T_{SearchDeltaP}$ in the low mobility criterion.

In an implementation, in order to avoid waste of network resources, the implementation of step 202 may also include step 402. In step 402, it is prohibited to send the indication information that the terminal device meets the target relaxed measurement criterion to the network device, in response to the terminal device being in the relaxed measurement state for the target relaxed measurement criterion.

It may be understood that, since the terminal device in the relaxed measurement state still performs signal measurement in a measurement mode in the relaxed state, the terminal device in the relaxed measurement state still determines whether a certain relaxed measurement state is currently met by the signal measurement. However, for the terminal device in a relaxed measurement state for a certain relaxed measurement criterion, in case that it is found by the signal measurement that the relaxed measurement criterion has been met, and at this time, in case that it is found that the indication information that the terminal device meets the relaxed measurement criterion is still sent to the network device, after the relaxed criterion is met, it will undoubtedly to cause the waste of network resources due to sending repeated indication information. Therefore, for the terminal device in the relaxed measurement state for the target relaxed measurement criterion, it is prohibited to send the indication information that the terminal device meets the target relaxed measurement criterion to the network device, which may avoid the waste of network resources and save network signaling overhead.

In addition, for the terminal device in the relaxed measurement state, it is possible that the relaxed measurement criterion is not met at a certain moment. In view of this situation, the implementation of step 202 in the embodiment of the present disclosure may also include step 403. In step 403, the relaxed measurement state for the target relaxed measurement criterion is exited, and the indication information that the relaxed measurement criterion is not met is sent to the network device according to a second configuration switch, in response to the terminal device being in the relaxed measurement state for the target relaxed measurement criterion and not meeting the relaxed measurement criterion at any moment.

That is, the decision period is not considered when exiting the relaxed measurement state. In case that the terminal device in a relaxed measurement state for a certain relaxed measurement criterion does not meet the relaxed measurement criterion, it exits the relaxed measurement state and sends the indication information that the relaxed measurement criterion is not met to the network device according to the configuration switch. In this way, when a certain relaxed measurement criterion is not met, a corresponding relaxed measurement state is exited in time, which may avoid a situation that the terminal device in the connected state cannot switch timely to cause service interruption due to the inability to measure the signal quality efficiently. In addition, whether to send the indication information to the network device is determined according to the second configuration switch, which also increases the flexibility of configuration and improves the applicability of the method.

In an example, the implementation of sending the indication information that the relaxed measurement criterion is not met to the network device according to the second configuration switch may be as follows. The indication information that the relaxed measurement criterion is not met is sent to the network device, in response to the second configuration switch being in a first state. It is prohibited to send the indication information that the relaxed measurement criterion is not met to the network device, in response to the second configuration switch being in a second state.

In order to make the above-mentioned implementation easier to understand, a decision period configured for the non-cell edge criterion and an operation of the terminal device are taken as an example for description below.

(1) The network terminal modifies a criterion formula of the non-cell edge to increase the decision period.

(2) When the terminal device enters the connected state, the network terminal configures parameters required by the non-cell edge criterion for the terminal device in some way (such as a RRC dedicated instruction), including the decision period for measuring the non-cell edge criterion.

(3) For the terminal device that is not in the relaxed measurement state, when it is found by measurement that the non-cell edge criterion is satisfied for a time exceeding the duration of the decision period, indication information that the non-cell edge criterion is met is sent to the network device.

(4) For the terminal device that is in the relaxed measurement state, it is continuously found by measurement that the non-cell edge criterion is met, and regardless of whether met time exceeds several decision periods, the terminal device does not send indication information that the non-cell edge criterion is met to the network device.

(5) For the terminal device that is in the relaxed measurement state, in case that it is found that the non-cell edge criterion is not met at any moment, it may immediately exit the relaxed measurement state without making a decision on the decision period, and may send indication information that the non-cell edge criterion is not met to the network device according to the configuration switch. For example, in case that the switch is true, indication information that the non-cell edge criterion is not met is sent to the network device. When the configuration switch is false, it is prohibited to send indication information that the non-cell edge criterion is not met to the network device.

According to the method for controlling the triggering of the relaxed measurement criterion in the embodiment of the present disclosure, the reporting behavior of the terminal device is restricted by the decision period configured for the relaxed measurement criterion. For the terminal device that is not in the relaxed measurement state, it may report to the network device merely after meeting a certain relaxed measurement criterion for a time exceeding a corresponding decision period, which may prevent the terminal device from reporting to the network device since it temporarily meets the relaxed measurement criterion, thus avoiding the frequently reporting of the terminal device and saving network signaling overhead. At the same time, for the terminal device meeting a certain relaxed measurement state, it is not allowed to send the indication information that the relaxed measurement criterion is met to the network device, which may avoid the waste of network resources caused by sending repeated indication information. In addition, for the terminal device in the relaxed measurement state, when it is found that the relaxed measurement criterion is not met, it immediately exits the relaxed measurement state without considering the decision period, and the indication information that the relaxed measurement criterion is not met is sent to the network device based on the configuration switch. In this way, on the one hand, it may avoid the situation that the terminal device in the connected state cannot switch timely to cause service interruption due to the inability to measure the signal quality efficiently. On the other hand, the flexibility of configuration may be increased and the applicability of the method is improved by determining whether to send the indication information to the network device according to the configuration switch.

Since the communication system provided in the present disclosure includes not only the terminal device, but also a network device, a method for controlling triggering of a relaxed measurement criterion provided in the present disclosure will be introduced below for the network device.

Figure 5:
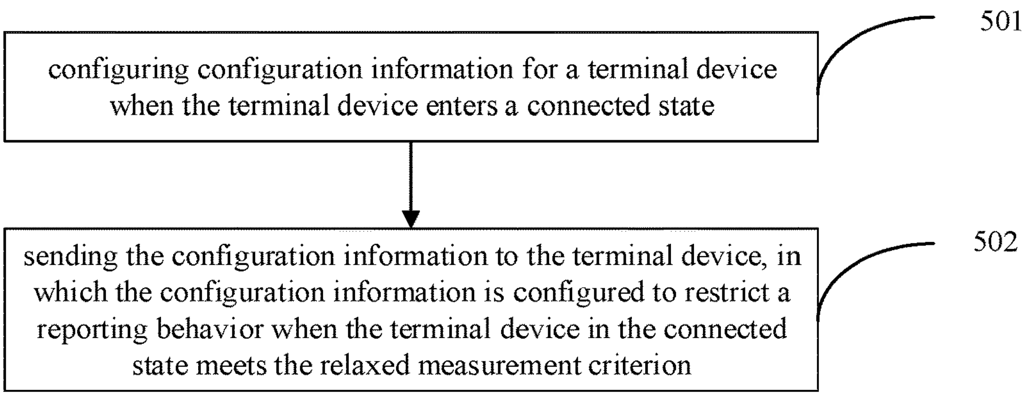
FIG. 5 is a flow chart of another method for controlling triggering of a relaxed measurement criterion provided in an embodiment of the present disclosure.

FIG. 5 is a flow chart of another method for controlling triggering of a relaxed measurement criterion provided in an embodiment of the present disclosure. The method may be performed by a network device. As shown in FIG. 5, the method may include, but is not limited to steps as follows.

In step 501, configuration information is configured for a terminal device when the terminal device enters a connected state.

In an implementation, the configuration information configured by the network device for the terminal device at least includes any one of a reporting prohibition timer, or a decision period configured for the relaxed measurement criterion. The reporting prohibition timer may be understood as prohibiting the terminal device from reporting relevant indication information to the network device when the timer is running. The decision period configured for the relaxed measurement criterion may be understood as that the terminal device may report indication information that the relaxed measurement criterion is met to the network device merely after the terminal device meets a certain relaxed measurement criterion and reaches a corresponding decision period. The reporting prohibition timer may be a timer configured by the network device one for each relaxed measurement criterion, or may be a timer configured by the network device one for multiple relaxed measurement criteria. The decision period configured for the relaxed measurement criterion may be a decision period configured for a certain relaxed measurement criterion.

In step 502, the configuration information is sent to the terminal device. The configuration information is configured to restrict a reporting behavior when the terminal device in the connected state meets the relaxed measurement criterion.

That is, after the network device sends the configuration information to the terminal device, the terminal device may restrict its reporting behavior when the terminal device in the connected state meets the relaxed measurement criterion according to the configuration information, and the specific implementation may be as described in the above-mentioned embodiments.

According to the method for controlling the triggering of the relaxed measurement criterion provided in the embodiment of the present disclosure, when the terminal device enters the connected state, the network device configures the configuration information for the terminal device and sends the configuration information to the terminal device, so that the terminal device may restrict the reporting behavior when the terminal device in the connected state meets the relaxed measurement criterion, thus reducing the waste of network resources and saving network signaling overhead.

In order to realize the configurability of the terminal device sending the indication information about the relaxed measurement criterion to the network device, the present disclosure provides another embodiment.

Figure 6:
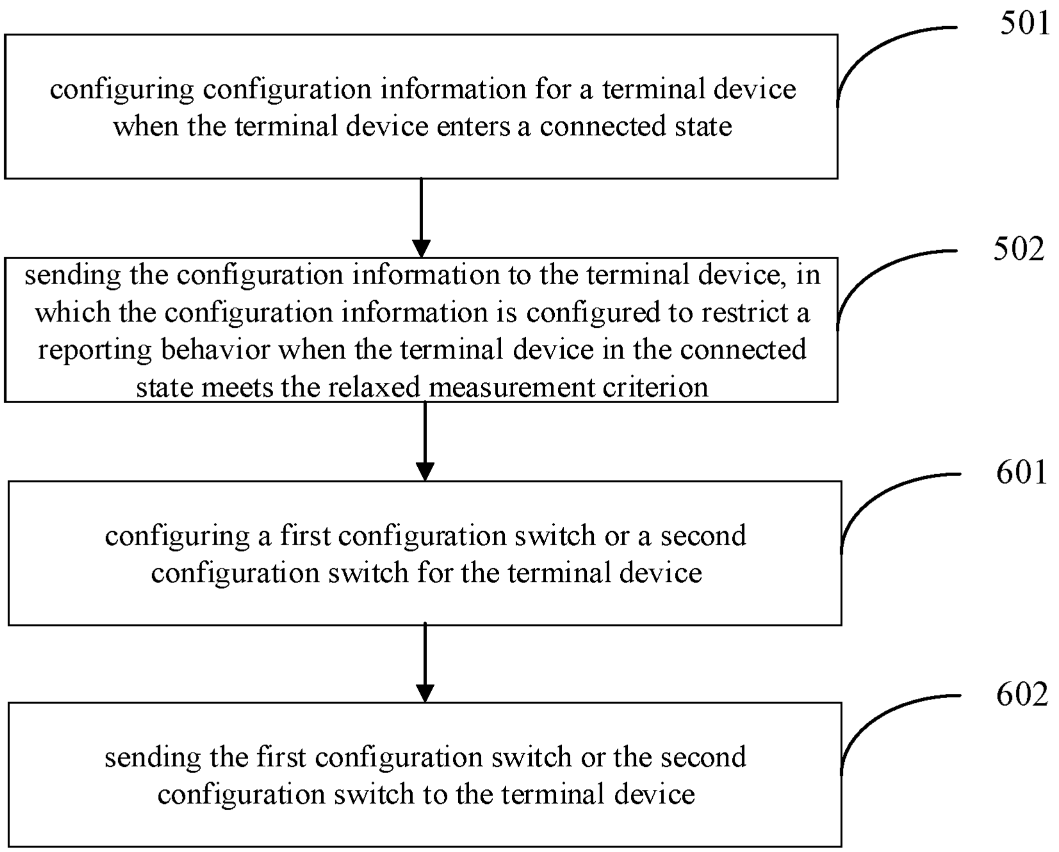
FIG. 6 is a flow chart of another method for controlling triggering of a relaxed measurement criterion provided in an embodiment of the present disclosure.

FIG. 6 is a flow chart of another method for controlling triggering of a relaxed measurement criterion provided in an embodiment of the present disclosure. The method may be performed by a network device, as shown in FIG. 6. Based on the above-mentioned embodiments, the method may also include, but is not limited to steps as follows.

In step 601, a first configuration switch or a second configuration switch is configured for the terminal device.

Both the first configuration switch and the second configuration switch may be configured to control whether the terminal device sends the indication information that the relaxed measurement criterion is not met to the network device. The first configuration switch may be used in a case that the configuration information includes the reporting prohibition timer, and the second configuration switch may be used in a case that the configuration information includes the decision period configured for the relaxed measurement criterion.

In step 602, the first configuration switch or the second configuration switch is sent to the terminal device.

In an implementation, after the network device sends the first configuration switch or the second configuration switch to the terminal device, the terminal device may perform steps as follows.

(1) The relaxed measurement state is exited and indication information that the relaxed measurement criterion is not met is sent to the network device according to a first configuration switch, in response to the terminal device being in the relaxed measurement state and not meeting the relaxed measurement criterion at any moment. For example, the indication information that the relaxed measurement criterion is not met is sent to the network device, in response to the first configuration switch being in a first state, it is prohibited to send the indication information that the relaxed measurement criterion is not met to the network device, in response to the first configuration switch being in a second state.

(2) The relaxed measurement state for the target relaxed measurement criterion is exited, and the indication information that the relaxed measurement criterion is not met is sent to the network device according to a second configuration switch, in response to the terminal device being in the relaxed measurement state for the target relaxed measurement criterion and not meeting the relaxed measurement criterion at any moment. For example, the indication information that the relaxed measurement criterion is not met is sent to the network device, in response to the second configuration switch being in a first state, it is prohibited to send the indication information that the relaxed measurement criterion is not met to the network device, in response to the second configuration switch being in a second state.

According to the method for controlling the triggering of the relaxed measurement criterion provided in the embodiment of the present disclosure, the network device is added to configure the first configuration switch or the second configuration switch for the terminal device, and send the configuration switch to the terminal device, so that the terminal device may determine whether to send the indication information to the network device according to the configuration switch, which not only increases the flexibility of configuration, but also improves the applicability of the method.

In the above-mentioned embodiments provided in the present disclosure, the methods provided in the embodiments of the present disclosure are introduced from perspectives of the terminal device and the network side device, respectively. In order to realize various functions in the method provided in the above-mentioned embodiment of the present disclosure, the terminal device and the network side device may include a hardware structure and a software module, and the above-mentioned various functions are realized in a form of a hardware structure, a software module, or a hardware structure plus a software module. A certain function in the above-mentioned various functions may be implemented in a form of a hardware structure, a software module, or a hardware structure plus a software module.

Figure 7:
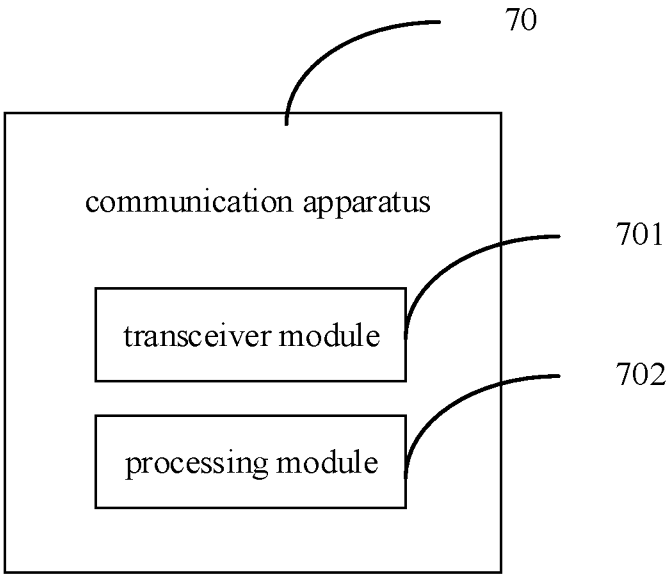
FIG. 7 is a schematic diagram of a communication apparatus provided in an embodiment of the present disclosure.

FIG. 7 is a schematic diagram of a communication apparatus provided in an embodiment of the present disclosure. The communication apparatus 70 shown in FIG. 7 may include a transceiver module 701. The transceiver module 701 may include a sending module and/or a receiving module. The sending module is configured to realize a sending function, and a receiving module is configured to realize a receiving function. The transceiver module 701 may be configured to realize a sending function and/or a receiving function.

The communication apparatus 70 may be a terminal device (such as the terminal device in the above-mentioned method embodiments), may be an apparatus in the terminal device, and may also be an apparatus capable of matching and adapting to the terminal device. Alternatively, the communication apparatus 70 may be a network device, may be an apparatus in the network device, and may be an apparatus that may be matched with the network device.

The communication apparatus 70 is a terminal device. In the embodiment of the present disclosure, the transceiver module 701 is configured to receive configuration information configured by a network device when the terminal device enters a connected state, and is also configured to restrict a reporting behavior when the terminal device in the connected state meets the relaxed measurement criterion, according to the configuration information.

The configuration information at least includes any one of a reporting prohibition timer, or a decision period configured for the relaxed measurement criterion.

In an implementation, the reporting prohibition timer may be a timer configured by the network device one for each relaxed measurement criterion. Alternatively, the reporting prohibition timer may be a timer configured by the network device one for multiple relaxed measurement criteria.

In an alternative implementation, the configuration information includes the reporting prohibition timer. The transceiver module 701 is specifically configured to send indication information that the relaxed measurement criterion is met to the network device, for the terminal device that is not in a relaxed measurement state for a target relaxed measurement criterion, in response to finding that the terminal device meets the relaxed measurement criterion and the reporting prohibition timer is not running.

In another alternative implementation, the transceiver module 701 is further configured to prohibit to send indication information that the terminal device meets the target relaxed measurement criterion to the network device, in response to the terminal device being in the relaxed measurement state for the target relaxed measurement criterion.

In yet another alternative implementation, the transceiver module 701 is further configured to send indication information that the relaxed measurement criterion is not met to the network device according to a first configuration switch, in response to the terminal device being in the relaxed measurement state and not meeting the relaxed measurement criterion at any moment. Further, in some embodiments of the present disclosure, the transceiver module 701 is specifically configured to send the indication information that the relaxed measurement criterion is not met to the network device, in response to the first configuration switch being in a first state, prohibit to send the indication information that the relaxed measurement criterion is not met to the network device, in response to the first configuration switch being in a second state.

Alternatively, in an embodiment of the present disclosure, the communication apparatus 700 may further include a processing module 702, which may be a processor. The processing module 702 is configured to start or restart the reporting prohibition timer, when the processing module sends the indication information to the network device.

In an implementation, the configuration information includes the decision period. The transceiver module 701 is specifically configured to send indication information that a target relaxed measurement criterion is met to the network device, for the terminal device that is not in a relaxed measurement state for the target relaxed measurement criterion, in response to finding that the terminal device meets the target relaxed measurement criterion for a time exceeding a duration of the decision period.

Alternatively, the transceiver module 701 is further configured to prohibit to send the indication information that the terminal device meets the target relaxed measurement criterion to the network device, in response to the terminal device being in the relaxed measurement state for the target relaxed measurement criterion.

In an alternative implementation, the transceiver module 701 is further configured to exit the relaxed measurement state for the target relaxed measurement criterion, and send the indication information that the relaxed measurement criterion is not met to the network device according to a second configuration switch, in response to the terminal device being in the relaxed measurement state for the target relaxed measurement criterion and not meeting the relaxed measurement criterion at any moment. In some embodiments of the present disclosure, the transceiver module 701 is specifically configured to send the indication information that the relaxed measurement criterion is not met to the network device, in response to the second configuration switch being in a first state, prohibit to send the indication information that the relaxed measurement criterion is not met to the network device, in response to the second configuration switch being in a second state.

The communication apparatus 70 is a network device. In some embodiments of the present disclosure, a processing module 702 is configured to configure configuration information for a terminal device when the terminal device enters a connected state. A transceiver module 701 is configured to send the configuration information to the terminal device. The configuration information is configured to restrict a reporting behavior when the terminal device in the connected state meets a relaxed measurement criterion.

The configuration information at least includes any one of a reporting prohibition timer, or a decision period configured for the relaxed measurement criterion.

In an alternative implementation, the reporting prohibition timer is a timer configured by the network device one for each relaxed measurement criterion. Alternatively, the reporting prohibition timer is a timer configured by the network device one for multiple relaxed measurement criteria.

Alternatively, in an embodiment of the present disclosure, the processing module 702 is further configured to configure a first configuration switch or a second configuration switch for the terminal device. The transceiver module 701 is further configured to send the first configuration switch or the second configuration switch to the terminal device.

With respect to the apparatus in the above-mentioned embodiment, the specific manners for performing operations for individual modules therein have been described in detail in the embodiments regarding the method, which will not be elaborated herein.

Figure 8:
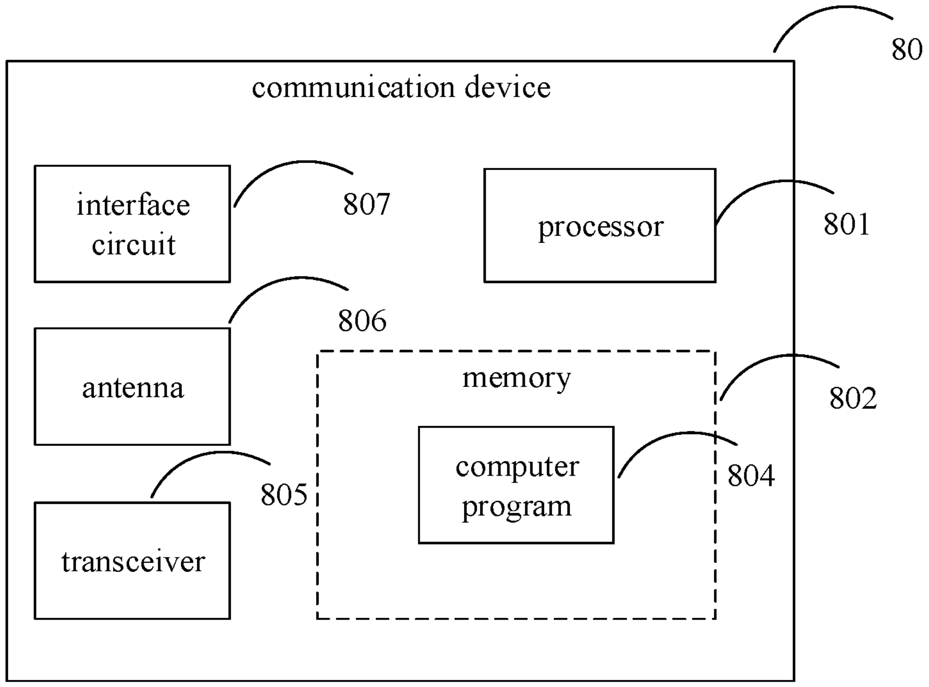
FIG. 8 is a schematic diagram of another communication device provided in an embodiment of the present disclosure.

Referring to FIG. 8, FIG. 8 is a schematic diagram of a communication device 80 provided in an embodiment of the present disclosure. The communication device 80 may be a network device, may be a terminal device, may be a chip, a chip system, or a processor that supports the network device to implement the above-mentioned method, and may also be a chip, a chip system, or a processor that supports the terminal device to implement the above-mentioned method. The device may be configured to implement the method described in the above-mentioned method embodiment. For details, reference may be made to the description in the above-mentioned method embodiment.

The communication device 80 may include one or more processors 801. The processor 801 may be a generic processor, a specific processor, or the like. For example, the processor 801 may be a baseband processor or a central processor. The baseband processor may be configured to process a communication protocol and communication data, and the central processor may be configured to control a communication device (such as, a base station, a baseband chip, a terminal, a terminal chip, a DU, or a CU, etc.), execute computer programs, and process data of the computer programs.

Alternatively, the communication device 80 may further include one or more memories 802, on which a computer program 804 may be stored, and the processor 801 executes the computer program 804, so that the communication device 80 executes the method described in the above-mentioned method embodiments. Alternatively, data may also be stored in the memory 802. The communication device 80 and the memory 802 may be set separately or integrated together.

Alternatively, the communication device 80 may further include a transceiver 805 and an antenna 806. The transceiver 805 may be referred to as a transceiver unit, a transceiver machine, or a transceiver circuit, etc., and is configured to realize a transceiver function. The transceiver 805 may include a receiver and a transmitter. The receiver may be referred to as a receiver machine or a receiving circuit, etc., for realizing a receiving function. The transmitter may be referred to as a transmitting machine or a transmitting circuit, etc., and is configured to realize a transmitting function.

Alternatively, the communication device 80 may further include one or more interface circuits 807. The interface circuit 807 is configured to receive code instructions and transmit the code instructions to the processor 801. The processor 801 executes the code instructions to enable the communication device 80 to perform the method described in the above-mentioned method embodiments.

The communication device 80 is a terminal device (such as the terminal device in the above-mentioned method embodiment). The transceiver 805 is configured to execute steps 201 and 202 in FIG. 2, execute steps 301, 302 and 303 in FIG. 3, and execute steps 401, 402 and 403 in FIG. 4. The processor 801 is configured to perform step 304 in FIG. 3.

The communication device 80 is a network device. The transceiver 805 is configured to execute step 502 in FIG. 5, and execute step 602 in FIG. 6. The processor 801 is configured to execute step 501 in FIG. 5, and execute step 601 in FIG. 6.

In an implementation, the processor 801 may include a transceiver configured to receive and transmit functions. For example, the transceiver may be a transceiver circuit, an interface, or an interface circuit. The transceiver circuit, the interface, or the interface circuit configured to receive and transmit the functions may be separated or integrated together. The transceiver circuit, the interface, or the interface circuit may be configured to read and write codes/data, or the transceiver circuit, the interface, or the interface circuit may be configured for signal transmission or transfer.

In an implementation, the processor 801 may store a computer program 803, and the computer program 803 runs on the processor 801, which may cause the communication device 80 execute the method described in the above-mentioned method embodiments. The computer program 803 may be solidified in the processor 801, and in this case, the processor 801 may be implemented by hardware.

In an implementation, the communication device 80 may include a circuit, and the circuit may realize a function of transmitting, receiving or communicating in the above-mentioned method embodiments. The processor and transceiver described in the present disclosure may be implemented on an integrated circuit (IC), an analog IC, a radio frequency integrated circuit (RFIC), a mixed-signal IC, an application specific integrated circuit (ASIC), a printed circuit board (PCB), an electronic device, and the like. The processor and the transceiver may also be manufactured by using various IC process technologies, such as complementary metal oxide semiconductor (CMOS), an nMetal-oxide-semiconductor (NMOS), a positive channel metal oxide semiconductor (PMOS), a bipolar junction transistor (BJT), a bipolar CMOS (BiCMOS), silicon germanium (SiGe), gallium arsenide (GaAs), etc.

The communication device described in the above-mentioned embodiment may be the network device or the terminal device (such as the first terminal device in the above-mentioned method embodiment), but the scope of the communication device described in the present disclosure is not limited thereto, and a structure of the communication device may not be limited by FIG. 8. The communication device may be a stand-alone device or may be part of a larger device. For example, the communication device may be: (1) a stand-alone integrated circuit (IC), a chip, or a chip system or a subsystem, (2) a set of one or more ICs, additionally, the set of the IC may also include storage components for storing data and computer programs, (3) an ASIC, such as a modem, (4) a module that may be embedded in other devices, (5) a receiver, a terminal, an intelligent terminal, a cellular phone, a wireless device, a handset, a mobile unit, a vehicle-mounted device, a network device, a cloud equipment, an artificial intelligence device, etc., (6) other devices, and so on.

Those skilled in the art may also understand that various illustrative logical blocks and steps listed in the embodiments of the present disclosure may be implemented by an electronic hardware, a computer software, or a combination thereof. Whether this function is realized by a hardware or a software depends on a specific application and design requirements of the whole system. Those skilled in the art may use various methods to realize the described functions for each specific application, but this realization should not be understood as beyond the scope of protection of the embodiments of the present disclosure.

An embodiment of the present disclosure also provides a communication system. The system includes a communication apparatus as a terminal device and a communication apparatus as a network device in the above-mentioned embodiments of FIG. 7. Alternatively, the system includes a communication device as a terminal device and a communication device as a network device in the above-mentioned embodiments of FIG. 8.

The present disclosure also provides a non-transitory computer-readable storage medium having stored therein instructions that, when executed by a computer, cause functions of any one of the above-mentioned method embodiments to be implemented.

The present disclosure also provides a computer program product that, when executed by a computer, cause functions of any one of the above-mentioned method embodiments to be implemented.

In the above-mentioned embodiments, all or part of the functions may be realized by a software, a hardware, a firmware or any combination thereof. When the functions is realized by using a software, all or part of the functions may be realized in a form of a computer program product. The computer program product includes one or more computer programs. When the computer program is loaded and executed on a computer, all or part of the functions is generated according to the processes or functions the embodiments of the present disclosure. The computer may be a generic computer, a specific computer, a computer network, or other programmable devices. The computer program may be stored in the non-transitory computer-readable storage medium or transmitted from one non-transitory computer-readable storage medium to another non-transitory computer-readable storage medium. For example, the computer program may be transmitted from a website, a computer, a server or a data center to another website, another computer, another server or another data center in a wired (for example, a coaxial cable, an optical fiber, a digital subscriber line (DSL)) or wireless (for example, infrared, wireless, microwave, etc.) manner. The non-transitory computer-readable storage medium may be any available medium that may be accessed by a computer or integrated with a data storage device such as a server, a data center that contains one or more available media. The available medium may be a magnetic medium (for example, a floppy disk, a hard disk, a magnetic tape), an optical medium (for example, a high-density digital video disc (DVD)), or a semiconductor medium (for example, a solid state disk (SSD)), etc.

It may be understood by those of ordinary skill in the art that numerical numbers such as the first, the second and the like involved in the present disclosure are merely a convenient distinction for description, and are not used to limit the scope of the embodiments of the present disclosure, but also indicate the sequence.

At least one of the present disclosure may also be described as one or plurality, and the plurality may be two, three, four or more, which is not limited in the present disclosure. In an embodiment of the present disclosure, for one technical feature, a technical feature in the technical feature is distinguished by “first,” “second,” “third,” “A,” “B,” “C,” and “D”. There is no precedence or magnitude order between the technical features described by "first," "second," "third," "A," "B," "C," and "D".

A correspondence shown in each table in the present disclosure may be configured or predefined. Values of the information in each table are merely examples, and may be configured as other values, which is not limited in the present disclosure. When configuring a correspondence between information and parameters, it is not necessary to configure all correspondences shown in each table. For example, in the table in the present disclosure, a correspondence shown in some rows may not be configured. For another example, appropriate deformation adjustments may be made based on the above-mentioned table, such as splitting, merging, and so on. Names of the parameters shown in the titles of the above-mentioned tables may also adopt other names that may be understood by the communication device, and values or representations of the parameters may also be other values or representations that may be understood by the communication device. Other data structures may also be adopted when the above-mentioned tables are implemented, such as arrays, queues, containers, stacks, linear tables, pointers, linked lists, trees, graphs, structures, classes, heaps, hash tables, etc.

The pre-definition in the present disclosure may be understood as definition, definition in advance, storage, pre-storage, pre-negotiation, pre-configuration, curing, or pre-firing.

Embodiments of the present disclosure provide a method for controlling triggering of a relaxed measurement criterion, a communication device, and a storage medium, which are applicable to a long term evolution (LTE) system, a 5th generation (5G) mobile communication system, and a 5G new radio system. Triggering of a relaxed measurement criterion may be controlled through configuration information when a terminal device enters a connected state, which may avoid the waste of signaling resources.

In a first aspect, an embodiment of the present disclosure provides a method for controlling triggering of a relaxed measurement criterion. The method is performed by a terminal device and includes receiving configuration information configured by a network device when the terminal device enters a connected state, and restricting a reporting behavior when the terminal device in the connected state meets the relaxed measurement criterion, according to the configuration information.

In this solution, according to the configuration information configured by the network device when the terminal device enters the connected state, the reporting behavior when the terminal device in the connected state meets the relaxed measurement criterion is restricted, so as to achieve the purpose of saving signaling overhead.

In an implementation, the configuration information at least includes any one of a reporting prohibition timer, or a decision period configured for the relaxed measurement criterion.

In this technical solution, the reporting behavior when the terminal device in the connected state meets the relaxed measurement criterion is restricted by a configured reporting prohibition timer and/or the decision period configured for the relaxed measurement criterion, so as to achieve the purpose of saving signaling overhead.

In a possible implementation, the reporting prohibition timer is a timer configured by the network device one for each relaxed measurement criterion, or the reporting prohibition timer is a timer configured by the network device one for multiple relaxed measurement criteria.

In an implementation, the configuration information includes the reporting prohibition timer, and restricting the reporting behavior when the terminal device in the connected state meets the relaxed measurement criterion, according to the configuration information, includes sending indication information that the relaxed measurement criterion is met to the network device, for the terminal device that is not in a relaxed measurement state for a target relaxed measurement criterion, in response to finding that the terminal device meets the relaxed measurement criterion and the reporting prohibition timer is not running.

In this solution, for the terminal device that is not in the relaxed measurement state, when it is found that the terminal device meets the relaxed measurement criterion and the reporting prohibition timer is not running, the indication information that the relaxed measurement criterion is met is sent to the network device. When the reporting prohibition timer is running, it is prohibited to send the indication information that the relaxed measurement criterion is met to the network device, thus achieving the purpose of saving power.

Alternatively, restricting the reporting behavior when the terminal device in the connected state meets the relaxed measurement criterion, according to the configuration information, further includes prohibiting to send indication information that the terminal device meets the target relaxed measurement criterion to the network device, in response to the terminal device being in the relaxed measurement state for the target relaxed measurement criterion.

In this solution, when the terminal device is in the relaxed measurement state for the target relaxed measurement criterion, in case that in case that the terminal device always meets the target relaxed measurement criterion and reports corresponding indication information to the network device after each determination, it means that the indication information reported by the terminal device to the network device is the same each time, which will undoubtedly cause unnecessary overhead. For the terminal device in the relaxed measurement state for the target relaxed measurement criterion, it is prohibited to send the indication information that the terminal device meets the target relaxed measurement criterion to the network device, which may prevent the terminal device from frequently reporting the same indication information to the network device and achieve the purpose of saving signaling overhead.

In an implementation, exiting the relaxed measurement state, and restricting the reporting behavior when the terminal device in the connected state meets the relaxed measurement criterion, according to the configuration information, further includes sending indication information that the relaxed measurement criterion is not met to the network device according to a first configuration switch, in response to the terminal device being in the relaxed measurement state and not meeting the relaxed measurement criterion at any moment.

In a possible implementation, sending the indication information that the relaxed measurement criterion is not met to the network device according to the first configuration switch includes sending the indication information that the relaxed measurement criterion is not met to the network device, in response to the first configuration switch being in a first state, prohibiting to send the indication information that the relaxed measurement criterion is not met to the network device, in response to the first configuration switch being in a second state.

In this solution, for the terminal device in the relaxed measurement state, in case that the relaxed measurement criterion is not met at any moment, the indication information that the relaxed measurement criterion is not met is sent to the network device via the first configuration switch. The first configuration switch is in the first state, and the indication information that the relaxed measurement criterion is not met is sent to the network device. The first configuration switch is in the second state, and it is prohibited to send the indication information that the relaxed measurement criterion is not met to the network device, so as to increase the flexibility of configuration and improve the applicability of the method.

Alternatively, restricting the reporting behavior when the terminal device in the connected state meets the relaxed measurement criterion, according to the configuration information, further includes starting or restarting the reporting prohibition timer, when sending the indication information to the network device.

In this solution, the reporting prohibition timer is started or restarted, when the indication information is sent to the network device, so that there is a certain time interval between each time the terminal device sends the indication information to the network device, so that the frequency of the terminal device reporting may be restricted and the signaling overhead may be saved.

In an implementation, the configuration information includes the decision period, and restricting the reporting behavior when the terminal device in the connected state meets the relaxed measurement criterion, according to the configuration information, includes sending indication information that a target relaxed measurement criterion is met to the network device, for the terminal device that is not in a relaxed measurement state for the target relaxed measurement criterion, in response to finding that the terminal device meets the target relaxed measurement criterion for a time exceeding a duration of the decision period.

In this solution, for a case that the configuration information includes the decision period, for the terminal device that is not in the relaxed measurement state, when it is found that the terminal device meets the relaxed measurement criterion and exceeds the duration of the decision period, it may avoid the case that the terminal device reports to the network device due to meeting the relaxed measurement criterion temporarily, thus avoiding the occurrence of a case that the terminal device frequently reports and saving network signaling overhead.

In a possible implementation, restricting the reporting behavior when the terminal device in the connected state meets the relaxed measurement criterion, according to the configuration information, further includes prohibiting to send the indication information that the terminal device meets the target relaxed measurement criterion to the network device, in response to the terminal device being in the relaxed measurement state for the target relaxed measurement criterion.

In an implementation, restricting the reporting behavior when the terminal device in the connected state meets the relaxed measurement criterion, according to the configuration information, further includes exiting the relaxed measurement state for the target relaxed measurement criterion, and sending the indication information that the relaxed measurement criterion is not met to the network device according to a second configuration switch, in response to the terminal device being in the relaxed measurement state for the target relaxed measurement criterion and not meeting the relaxed measurement criterion at any moment.

Alternatively, sending the indication information that the relaxed measurement criterion is not met to the network device according to the second configuration switch includes sending the indication information that the relaxed measurement criterion is not met to the network device, in response to the second configuration switch being in a first state, prohibiting to send the indication information that the relaxed measurement criterion is not met to the network device, in response to the second configuration switch being in a second state.

In a second aspect, an embodiment of the present disclosure provides another method for controlling triggering of a relaxed measurement criterion. The method is performed by a network device and includes configuring configuration information for a terminal device when the terminal device enters a connected state, and sending the configuration information to the terminal device. The configuration information is configured to restrict a reporting behavior when the terminal device in the connected state meets the relaxed measurement criterion.

In this solution, the network device configures the configuration information for the terminal device entering the connected state and sends the configuration information to the terminal device, so as to restrict the reporting behavior when the terminal device in the connected state meets the relaxed measurement criterion, so as to achieve the purpose of saving signaling overhead.

In an implementation, the configuration information at least includes any one of a reporting prohibition timer, or a decision period configured for the relaxed measurement criterion.

In a possible implementation, the reporting prohibition timer is a timer configured by the network device one for each relaxed measurement criterion, or the reporting prohibition timer is a timer configured by the network device one for multiple relaxed measurement criteria.

Alternatively, the method further includes configuring a first configuration switch or a second configuration switch for the terminal device, and sending the first configuration switch or the second configuration switch to the terminal device.

In a third aspect, an embodiment of the present disclosure provides a communication apparatus. The communication apparatus has some or all of functions of the terminal device to implement the method described in the first aspect above. For example, the functions of the communication apparatus may be provided with functions of some or all of embodiments of the present disclosure, or may be provided with functions of implementing any one of the embodiments of the present disclosure alone. The functions may be implemented by hardware, or may be implemented by hardware executing corresponding software. The hardware or software includes one or more units or modules corresponding to the above-mentioned functions.

In an implementation, a structure of the communication apparatus may include a transceiver module and a processing module. The processing module is configured to support the communication apparatus to perform corresponding functions in the above-mentioned method. The transceiver module is configured to support a communication between the communication apparatus and other devices. The communication apparatus may further include a storage module. The storage module is configured to be coupled with the transceiver module and the processing module, and store necessary computer programs and data of the communication apparatus.

In an example, the processing module may be a processor, the transceiver module may be a transceiver or a communication interface, and the storage module may be a memory.

In a fourth aspect, an embodiment of the present disclosure provides a communication apparatus. The communication apparatus has some or all of functions of the network device to implement the method described in the second aspect above. For example, functions of the communication apparatus may be provided with functions of some or all of embodiments of the present disclosure, or may be provided with the functions of implementing any one of the embodiments of the present disclosure alone. The functions may be implemented by hardware, or may be implemented by hardware executing corresponding software. The hardware or software includes one or more units or modules corresponding to the above-mentioned functions.

In an implementation, a structure of the communication apparatus may include a transceiver module, and a processing module. The processing module is configured to support the communication apparatus to perform corresponding functions in the above-mentioned method. The transceiver module is configured to support a communication between the communication apparatus and other devices. The communication apparatus may further include a storage module. The storage module is configured to be coupled with the transceiver module and the processing module, and store necessary computer programs and data of the communication apparatus.

In an example, a processing module may be a processor, the transceiver module may be a transceiver or a communication interface, and the storage module may be a memory.

In a fifth aspect, an embodiment of the present disclosure provides a communication device. The communication device includes a processor that, when invoking a computer program in a memory, cause the method described in the first aspect to be implemented.

In a sixth aspect, an embodiment of the present disclosure provides a communication device. The communication device includes a processor that, when invoking a computer program in a memory, cause the method described in the second aspect to be implemented.

In a seventh aspect, an embodiment of the present disclosure provides a communication device. The communication device includes a processor, and a memory having stored therein computer programs. The processor is configured to execute the computer programs stored in the memory to cause the communication device to perform the method described in the first aspect.

In an eighth aspect, an embodiment of the present disclosure provides a communication device. The communication device includes a processor, and a memory having stored therein computer programs. The processor is configured to execute the computer programs stored in the memory to cause the communication device to perform the method described in the second aspect.

In a ninth aspect, an embodiment of the present disclosure provides a communication device. The communication device includes a processor and an interface circuit. The interface circuit is configured to receive code instructions and transmit the code instructions to the processor, and the processor is configured to execute the code instructions to cause the device to perform the method described in the first aspect.

In a tenth aspect, an embodiment of the present disclosure provides a communication device. The communication device includes a processor and an interface circuit. The interface circuit is configured to receive code instructions and transmit the code instructions to the processor, and the processor is configured to execute the code instructions to cause the device to perform the method described in the second aspect.

In an eleventh aspect, an embodiment of the present disclosure provides a communication system. The system includes the communication apparatus described in the third aspect and the communication apparatus described in the fourth aspect. Alternatively, the system includes the communication device described in the fifth aspect and the communication device described in the sixth aspect. Alternatively, the system includes the communication device described in the seventh aspect and the communication device described in the eighth aspect. Alternatively, the system includes the communication device described in the ninth aspect and the communication device described in the tenth aspect.

In a twelfth aspect, an embodiment of the present invention provides a non-transitory computer-readable storage medium having stored therein instructions used for the terminal device that, when executed, cause the terminal device to perform the method described in the first aspect.

In a thirteenth aspect, an embodiment of the present invention provides a non-transitory computer-readable storage medium having stored therein instructions used for the network device that, when executed, cause the network device to perform the method described in the second aspect.

In a fourteenth aspect, the present disclosure also provides a computer program product. The computer program product includes a computer program that, when run on a computer, causes the computer to perform the method described in the first aspect.

In a fifteenth aspect, the present disclosure also provides a computer program product. The computer program product includes a computer program that, when run on a computer, causes the computer to perform the method described in the second aspect.

In a sixteenth aspect, the present disclosure provides a computer program that, when run on a computer, causes the computer to perform the method described in the first aspect.

In a seventeenth aspect, the present disclosure provides a computer program that, when run on a computer, causes the computer to perform the method described in the second aspect.

Those of ordinary skill in the art may appreciate that units and algorithm steps of various examples described in conjunction with the embodiments disclosed herein may be implemented in an electronic hardware, or a combination of a computer software and the electronic hardware. Whether these functions are executed in a hardware or a software depends on the specific application and design constraints of the technical solution. Those skilled in the art may use different methods to implement the described functions for each specific application, but such implementation should not be considered beyond the scope of the present disclosure.

It may be clearly understood by those skilled in the art that for the convenience and conciseness of the description, specific working processes of the above-described systems, the apparatuses and the units may refer to corresponding processes in the above-mentioned method embodiments, which will not be elaborated herein.

The above is merely the specific implementation of the present disclosure, and the scope of the protection of the present disclosure is not limited thereto. Changes or substitutions will readily occur to those skilled in the art within the technical scope of the present disclosure, which is to be covered the scope of protection of the present disclosure.

Therefore, the scope of protection of the present disclosure is as set forth in the scope of protection of the claims.

What is claimed is:

1. A method for controlling triggering of a measurement relaxation criterion, performed by a user equipment (UE), comprising:

receiving configuration information configured by a network device; and restricting a reporting behavior of the UE in a radio resource control (RRC) connected state meeting the measurement relaxation criterion, according to the configuration information;

wherein the configuration information comprises a decision period configured for the measurement relaxation criterion; and restricting the reporting behavior of the UE in the RRC connected state meeting the measurement relaxation criterion, according to the configuration information, comprises:

in a case that the UE is not in a measurement relaxation state for a target measurement relaxation criterion, determining that the UE meets the target measurement relaxation criterion for a duration of the decision period, and sending indication information that the target measurement relaxation criterion is met to the network device.

2. The method of claim 1, wherein the configuration information further comprises:

a reporting prohibition timer.

3. The method of claim 2, wherein the reporting prohibition timer is a timer configured by the network device for each measurement relaxation criterion; or the reporting prohibition timer is a timer configured by the network device for multiple measurement relaxation criteria.

4. The method of claim 2, wherein the configuration information comprises the reporting prohibition timer; and restricting the reporting behavior of the UE in the RRC connected state meeting the measurement relaxation criterion, according to the configuration information, further comprises:

determining that the UE meets the measurement relaxation criterion and the reporting prohibition timer is not running, and sending indication information that the measurement relaxation criterion is met to the network device, wherein the UE is not in a measurement relaxation state for a target measurement relaxation criterion.

5. The method of claim 4, wherein restricting the reporting behavior of the UE in the RRC connected state meeting the measurement relaxation criterion, according to the configuration information, further comprises:

determining the UE being in the measurement relaxation state for the target measurement relaxation criterion, and prohibiting to send indication information that the UE meets the target measurement relaxation criterion to the network device.

6. The method of claim 4, wherein restricting the reporting behavior of the UE in the RRC connected state meeting the measurement relaxation criterion, according to the configuration information, further comprises:

starting or restarting the reporting prohibition timer.

7. The method of claim 1, wherein restricting the reporting behavior of the UE in the RRC connected state meeting the measurement relaxation criterion, according to the configuration information, further comprises:

determining that the UE is in the measurement relaxation state and does not meet the measurement relaxation criterion, and exiting the measurement relaxation state and sending indication information that the measurement relaxation criterion is not met to the network device.

8. The method of claim 7, wherein sending the indication information that the measurement relaxation criterion is not met to the network device according to the first configuration switch comprises:

determining the first configuration switch being in a first state, and sending the indication information that the measurement relaxation criterion is not met to the network device;

determining the first configuration switch being in a second state, and prohibiting to send the indication information that the measurement relaxation criterion is not met to the network device.

9. The method of claim 1, wherein restricting the reporting behavior of the UE in the RRC connected state meeting the measurement relaxation criterion, according to the configuration information, further comprises:

determining the UE being in the measurement relaxation state for the target measurement relaxation criterion, and prohibiting to send the indication information that the UE meets the target measurement relaxation criterion to the network device.

10. The method of claim 9, wherein restricting the reporting behavior of the UE in the RRC connected state meeting the measurement relaxation criterion, according to the configuration information, further comprises:

determining the UE being in the measurement relaxation state for the target measurement relaxation criterion and not meeting the measurement relaxation criterion, and exiting the measurement relaxation state for the target measurement relaxation criterion, and sending the indication information that the measurement relaxation criterion is not met to the network device according to a second configuration switch.

11. The method of claim 10, wherein sending the indication information that the measurement relaxation criterion is not met to the network device according to the second configuration switch comprises:

determining the second configuration switch being in a first state, and sending the indication information that the measurement relaxation criterion is not met to the network device;

determining the second configuration switch being in a second state, and prohibiting to send the indication information that the measurement relaxation criterion is not met to the network device.

12. A non-transitory computer-readable storage medium having stored therein instruction that, when executed, cause the method of claim 1 to be implemented.

13. A method for controlling triggering of a measurement relaxation criterion, performed by a network device, comprising:

configuring configuration information for a user equipment (UE), wherein the configuration information comprises a decision period configured for the measurement relaxation criterion; and sending the configuration information to the UE; wherein the configuration information is configured to restrict a reporting behavior of the UE in a radio resource control (RRC) connected state meeting the measurement relaxation criterion; and receiving from the UE indication information that a target measurement relaxation criterion is met; wherein the indication information is sent by the UE in a case where the UE is not in a measurement relaxation state for the target measurement relaxation criterion, and the UE meets the target measurement relaxation criterion for a duration of the decision period.

14. The method of claim 13, wherein the configuration information further comprises:

a reporting prohibition timer.

15. The method of claim 14, wherein the reporting prohibition timer is a timer configured by the network device for each measurement relaxation criterion; or the reporting prohibition timer is a timer configured by the network device for multiple measurement relaxation criteria.

16. The method of claim 13, further comprising:

configuring a first configuration switch or a second configuration switch for the UE; and sending the first configuration switch or the second configuration switch to the UE.

17. A communication device, comprising:

a processor; and a memory having stored therein computer programs;

wherein the processor is configured to execute the computer programs stored in the memory to cause the communication device to perform the method of claim 13.

18. A non-transitory computer-readable storage medium having stored therein instruction that, when executed, cause the method of claim 13 to be implemented.

19. A communication device, comprising:

a processor; and a memory having stored therein computer programs;

wherein the processor is configured to:

receive configuration information configured by a network device; and restrict a reporting behavior of the UE in a radio resource control (RRC) connected state meeting the measurement relaxation criterion, according to the configuration information;

wherein the configuration information comprises a decision period configured for the measurement relaxation criterion; and restricting the reporting behavior of the UE in the RRC connected state meeting the measurement relaxation criterion, according to the configuration information, comprises:

in a case that the UE is not in a measurement relaxation state for a target measurement relaxation criterion, determining that the UE meets the target measurement relaxation criterion for a duration of the decision period, and sending indication information that the target measurement relaxation criterion is met to the network device.

* * * * *